May 5, 1931.  F. W. LUDWIG  1,803,761

BRACING FOR FREIGHT

Filed June 25, 1930  2 Sheets-Sheet 1

INVENTOR.
F. W. Ludwig.
BY
ATTORNEY.

Witness
C. C. McRae.

May 5, 1931.　　　　　F. W. LUDWIG　　　　　1,803,761

BRACING FOR FREIGHT

Filed June 25, 1930　　　2 Sheets-Sheet 2

INVENTOR.
F. W. Ludwig.

BY

ATTORNEY.

Witness
E. C. McRae

Patented May 5, 1931

1,803,761

UNITED STATES PATENT OFFICE

FREDERICK W. LUDWIG, OF DETROIT, MICHIGAN, ASSIGNOR TO FORD MOTOR COMPANY, OF DEARBORN, MICHIGAN, A CORPORATION OF DELAWARE

BRACING FOR FREIGHT

Application filed June 25, 1930. Serial No. 463,594.

The object of my invention is to provide bracing which may be conveniently fitted to the interior of a standard railway box car or other freight carrier to detachably secure automobile engines therein for shipment.

The modern method of manufacturing automobiles consists in manufacturing the individual parts and assembling them in unit such as the engine, clutch and transmission unit. The manufacturing and sub-assembly work is carried on in a centrally located plant and then shipping the units to various parts of the country where branch assembly plants are located, the units being there assembled to form complete automobiles. A great saving in transportation cost is effected by this procedure, as a box car which normally will hold only about six completed automobiles will carry sufficient units to form many times this number of automobiles.

Heretofore, when the individual units were to be shipped a great amount of shoring or bracing in the cars was necessary to insure against shifting of the relatively heavy units. It will be readily seen that if units, such as engine and tansmission assemblies, were allowed to shift in the car great damage would be done to the relatively fragile accessories thereon. The bracing formerly used for this purpose consisted of individual wooden engine beds for each unit, which beds were bolted to the car floor and braced from the sides and ceiling of the car by wooden braces. A great amount of material was required for each car which, due to the nailing and fitting to the particular engine beds, could not be used a second time. Further, the engine units were ordinarily placed horizontally so as to rest on the beds in spite of the greater floor space occupied by such an arrangement.

These units were of such great weight that only one layer could be placed in a car and successfully braced so that fenders, bodies or other light parts were packed in the space above the engines.

When using my improved bracing the engines are secured in the car in a novel position, which position allows the installation of about twice the number of engines formerly carried. The engine units are stood on end with their cylinder blocks extending in a diagonal position relative to the box car and the crank shafts in a vertical position. The upper end of each engine is secured only against radial movement while the lower end is secured both against radial and rotary movement. Very little bracing is required when the engines are so placed, there being only one brace extending across the car for each five units. The load on the individual braces is, of course, quite large so that steel construction is employed but as there is practically no lost space between the engines and they being placed on end, many more engines can be installed in a car than formerly possible.

Still a further object of my invention is to provide a type of shoring which is permanently fitted to the box car and which consists of only a fraction of the bracing members formerly necessary. The elimination of wooden shoring which was formerly destroyed at the completion of each trip makes an enormous saving in the cost of the shipments. Further, a car equipt with my improved bracing may be loaded in only a fraction of the time formerly required so that a great saving in labor is also effected.

With these and other objects in view my invention consists in the arrangement, construction and combination of the various parts of my improved bracing, as described in the specification, claimed in my claims, and illustrated in the accompanying drawings, in which:

Figure 2:
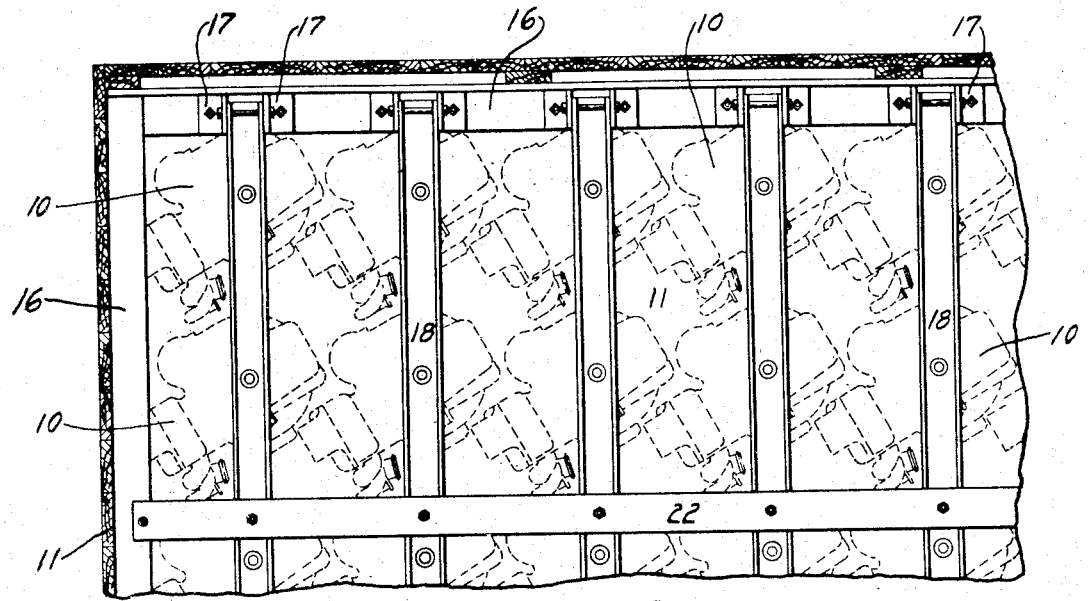
Figure 2 shows a top view of a portion of the box car shown in Figure 1, illustrating the position of the engines therein.
Figure 1:
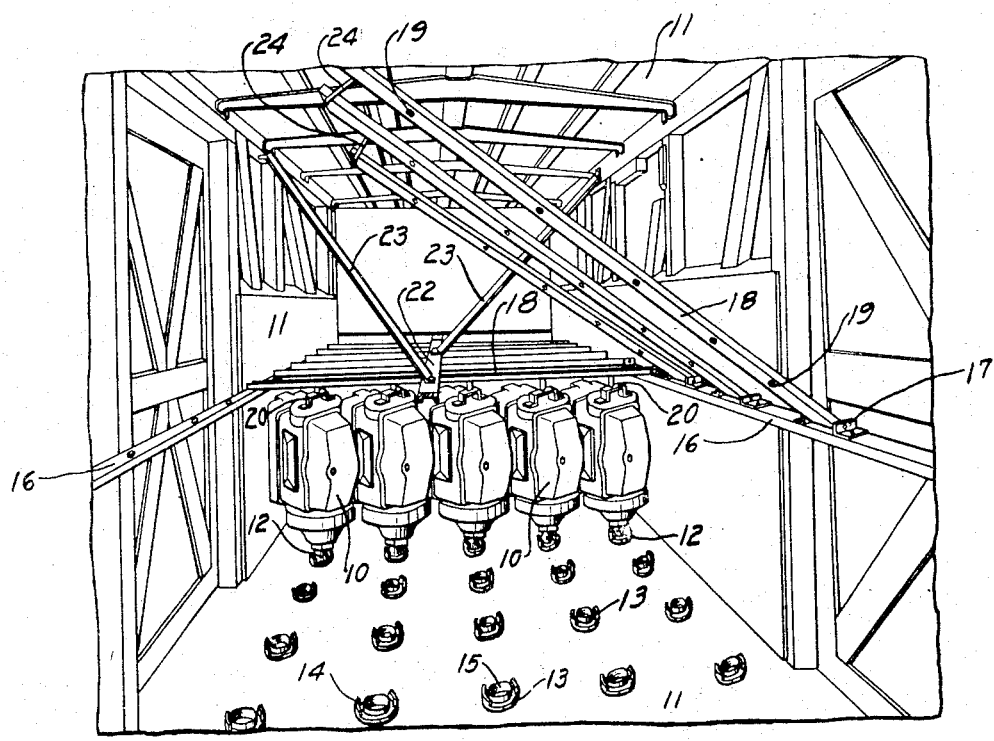
Figure 1 shows a perspective view of a box car in which engines are being loaded using my improved bracing therein.
Figure 3:
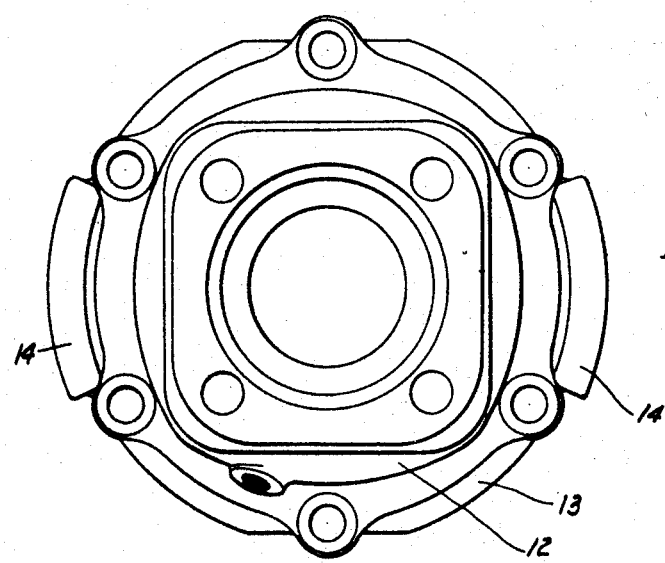
Figure 3 shows a plan view of a floor flange, which forms part of my improved structure, one of the engine universal joint housings being shown in position on this flange.
Figure 4:
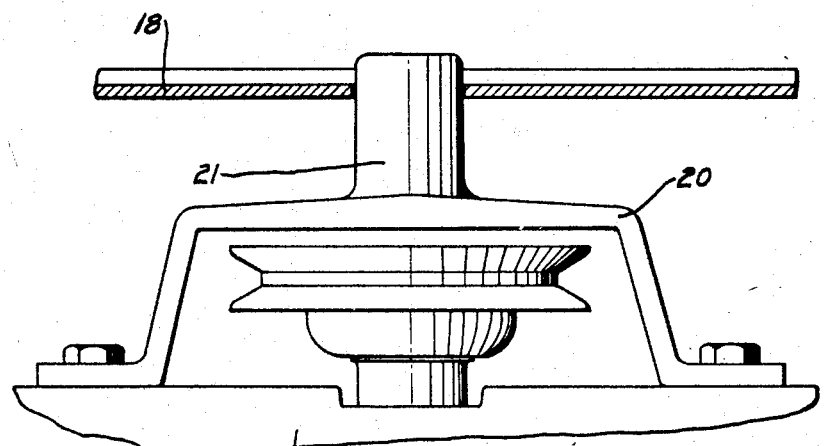
Figure 4 shows one of the brackets which are secured to the upper end of each engine unit and which co-acts with my bracing to secure the upper ends of the engines against radial movement.
Figure 5:
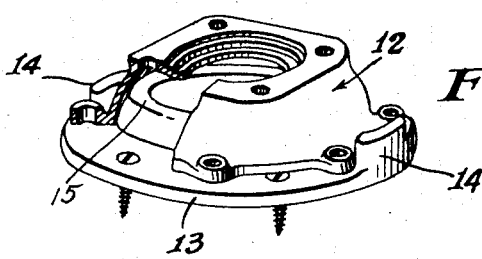
Figure 5 shows a perspective view of my improved floor flange co-acting with the lower engine housing, parts being broken away to better illustrate the construction.

Referring to the accompanying drawings, I have used the reference numeral 10 to indicate generally an automobile engine and transmission unit. These engines are placed in an ordinary box car 11, or other freight carriers, the engines being stood on end with their crank shafts extending in a vertical direction. A universal joint housing 12 forms the lower end of each engine and transmission unit so that the unit rests upon the housing. I have provided a plurality of floor flanges 13 adapted to be nailed to the floor of the car 11, each of the flanges having a pair of lugs 14 extending upwardly therefrom which co-act with suitable bosses on the housing 12 to prevent the engine unit from turning. A center projection 15 extends upwardly from each flange 13 which fits inside of the housing 12 thereby preventing radial movement of the unit.

Thus, when the engine is placed on one of these flanges the flange having been previously nailed to the floor of the car, the lower end of the engine is restricted against both radial movement and rotary movement around its crank shaft axis. The upper ends of these engines need, therefore, only be guided against radial movement to hold the crank shaft in a vertical position to insure against shifting of the engine units.

The function of the bracing which I am about to describe is for preventing radial movement of the upper ends of these units and consist of a pair of longitudinal strips 16 bolted to and extending along each side and the ends of the car 11 at a distance above the floor equivalent to the overall height of the engine units. A plurality of ears 17 are secured to the strips 16 on one side of the car, these ears being spaced along the strip from end to end of the car. Channel members 18 are pivotally mounted between each pair of these ears so as to swing across the car to position where they co-act with the opposite strip 16. Each of the channel members 18 are provided with a number of spaced openings 19 which in the ordinary installation consists of five openings to guide the upper ends of one row of engine units. The floor flanges 13 are nailed to the car floor directly beneath the openings 19 to guide the lower ends of these units.

A forked bracket 20 is secured to the upper end of each engine which bracket is provided with an upwardly extending pilot 21 in line with the engine crank shaft. These pilots co-act with the openings 19 to guide the upper end of the engine.

When the car is to be loaded, each engine is wheeled in and placed with its universal joint housing piloted on its flange 13. The end rows of the car are first filled and the engine nearest to the hinged strip 16 is first installed. The channel 18 is then dropped down until the pilot 21 enters the adjacent opening 19 and then the next engine is wheeled in place and the channel swung further down until the second pilot enters the second opening and so on until one row of engines is installed across the car. The free end of the channel member is then bolted to the opposite strip 16 which secures that particular row of engines in place.

The next row of engines is likewise placed in the car and so on until all of the car is filled at which time a longitudinal bar 22 is bolted to the center of each channel 18 which bar extends from end to end of the car. Several diagonal braces 23 are pivoted to the upper corners of the car so as to swing down in position to be bolted to the bar 22. It will be seen that the braces 22 strengthen the center portions of the channel members 18 thereby preventing these members from raising upwardly to release the engine units.

I have provided a plurality of hooks 24 secured to the roof of the car, one directly above each channel member 18, so that as the car is being unloaded the channel members may be successively hooked to the roof of the car so that access may be had to the engines in the succeeding rows.

It will, of course, be apparent that the space in the car above the channel members 18 may be used to ship light parts, such as fenders, wheels, tires or similar parts, the same as in the conventional method of loading engines in cars.

Among the many advantages arising from the use of my improved device, it may be well to mention that I have provided bracing whereby almost twice the number of engines may be transported in a box car as were formerly possible, while at the same time each motor is securely supported in a manner superior to the conventional wooden shoring. Further, the novel means whereby the lower ends of the engine units are prevented against both radial and rotary motion while the upper ends are prevented against radial motion forms a new device for securing engines for shipment. Still further, by hinging the channel members 18 to one side of the car, the motors may be conveniently installed therein one at a time so that a minimum amount of labor is required.

Some changes may be made in the arrangement, construction and combination of the various parts of my improved device, without departing from the spirit of my invention, and it is my intention to cover by my claims, such changes as may reasonably be included within the scope thereof.

I claim as my invention:

1. In a device of the character described, a freight carrier, an engine unit disposed in said carrier with its crank shaft extending in a vertical direction, a flange secured to the floor of said carrier which pilots the lower end of said engine, and means extending across the carrier and detachably secured to each side thereof which pilots the upper end of said engine.

2. In a device of the character described, a freight carrier, a plurality of engine units disposed in said carrier with their crank shafts extending in a vertical direction and with their cylinder blocks projecting diagonally to the lines of said carrier so that the crank case of one unit may overlap the cylinder head of the next unit, flanges secured to the floor of said carrier in position to pilot the lower ends of said units, and means extending across the carrier and detachably secured to each side thereof which pilots the upper ends of said units.

3. In a device of the character described, a freight carrier, an engine unit disposed in said carrier with its crank shaft extending in a vertical direction, a flange secured to the floor of said carrier in position to pilot the lower end of said engine, means extending across the carrier and detachably secured to each side thereof which pilots the upper end of said engine, and means for preventing rotary movement of said engine around said flange.

4. In a device of the character described, a freight carrier, an engine unit disposed in said carrier with its crank shaft extending in a vertical direction, a flange secured to the floor of said carrier in position to pilot the lower end of said engine against radial movement, a projection extending from said flange co-acting with said engine unit to prevent rotary movement thereof, and a bar extending across the carrier and detachably secured to each side thereof which pilots the upper end of said unit against radial movement.

5. In a device of the character described, a freight carrier, an engine unit disposed in said carrier with its crank shaft extending in a vertical direction, a flange secured to the floor of said carrier in position to pilot the lower end of said unit, a pilot secured to the upper end of said engine aligned with the engine crank shaft, and a bar having an opening therein adapted to receive said pilot, said bar extending across the carrier and detachably secured to each side thereof for supporting the upper end of said engine against radial movement.

6. In a device of the character described, a freight carrier, an engine and transmission unit disposed in said carrier with the engine crank shaft extending in a vertical direction, a flange secured to the floor of said carrier in position to pilot the lower end of said transmission, lugs projecting upwardly from said flange adapted to co-act with said transmission to prevent rotary movement of the unit, and a bar extending across the carrier and detachably secured to each side thereof for piloting the upper end of said unit against radial movement.

7. In a device of the character described, a freight carrier, an engine unit disposed in said carrier with its crank shaft extending in a vertical direction, a flange secured to the floor of said carrier in position to pilot the lower end of said unit, a strip extending along each side of said carrier at a height substantially the same as the height of said engine unit, a bar extending between said strips having its ends securely fastened to each strip, and an opening in said bars adapted to co-act with the upper end of said engine to pilot same against radial movement.

8. In a device of the character described, a freight carrier, an engine unit disposed in said carrier with its crank shaft extending in a vertical direction, a flange secured to the floor of said carrier in position to pilot the lower end of said unit, a strip extending along each side of said carrier at a height substantially the same as the height of said engine unit, a bar pivotally connected to one of said strips so as to swing into connection with the opposite strip, means for fastening said bar to said opposite strip, and means for piloting the upper end of said unit by said bar.

9. In a device of the character described, a freight carrier, a plurality of engine units disposed in said carrier with their crank shafts extending in a vertical direction, a plurality of flanges secured to the floor of said carrier in position to pilot the lower ends of said units, a strip extending along each side of said carrier at a height substantially the same as the height of said units, a plurality of bars pivotally secured to one of said strips so as to swing into connection with the opposite strip, means for fastening the free ends of said bars to the opposite strip, and means for piloting the upper ends of said units in said bars.

10. In a device of the character described, a freight carrier, a plurality of engine units disposed in said carrier with their crank shafts extending in a vertical direction, a plurality of flanges secured to the floor of said carrier in position to pilot the lower ends of said units, a strip extending along each side of said carrier at a height substantially the same as the height of said units, a plurality of channel members extending between said strips having their ends fastened to each strip, and openings in said channel members adapted to co-act with the upper ends of said units to pilot same against radial movement.

11. In a device of the character described, a freight carrier, a plurality of engine units disposed in said carrier with their crank shafts extending in a vertical direction, a plurality of flanges secured to the floor of said carrier in position to pilot the lower end of said units, a strip extending along each side of said carrier at a height substantially the same as the height of said unit, a plurality of channel members pivotally connected to one of said strips so as to swing into connection with the opposite strip, means for fastening the free ends of said channels to the opposite strip, and means for piloting the upper ends of said units in said channels.

12. In a device of the character described, a freight carrier, a plurality of engine units disposed in said carrier with their crank shafts extending in a vertical direction, flanges secured to the floor of said carrier which pilot the lower ends of said units, a plurality of bars hinged to one side of said carrier in position to swing into engagement with the opposite side thereof, and means for piloting the upper ends of said units in said bars.

13. In a device of the character described, a freight carrier, a plurality of engine units disposed in said carrier with their crank shafts extending in a vertical direction, flanges secured to the floor of said carrier which pilot the lower ends of said units, a plurality of channel members hinged to one side of said carrier in position to swing from the roof thereof into engagement with the opposite side, hooks fastened to the roof of said carrier arranged to co-act with the free ends of said channels to detachably secure them in an upper position, and means for piloting the upper ends of said units in said channels when the latter are swung into position engaging the opposite side of the carrier.

14. In a device of the character described, a freight carrier, a plurality of engine units disposed in said carrier with their crank shafts extending in a vertical direction, flanges secured to the floor of said carrier which pilot the lower ends of said units, angle strips extending along each side of said carrier, a plurality of channel members hinged to one of said angles so as to swing into engagement with the opposite strip, and means for piloting the upper ends of said units in said channels.

June 12, 1930.

FREDERICK W. LUDWIG.